United States Patent
Kumar et al.

(10) Patent No.: US 10,031,044 B2
(45) Date of Patent: Jul. 24, 2018

(54) REAL-TIME MONITORING OF A METAL SURFACE

(71) Applicants: Amit Kumar, Houston, TX (US); Ramani V. Reddy, The Woodlands, TX (US)

(72) Inventors: Amit Kumar, Houston, TX (US); Ramani V. Reddy, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 69 days.

(21) Appl. No.: 14/659,174

(22) Filed: Mar. 16, 2015

(65) Prior Publication Data

US 2015/0285705 A1 Oct. 8, 2015

Related U.S. Application Data

(60) Provisional application No. 61/975,590, filed on Apr. 4, 2014.

(51) Int. Cl.
 *G01M 5/00* (2006.01)
 *G01M 11/08* (2006.01)

(52) U.S. Cl.
 CPC ........ *G01M 5/0066* (2013.01); *G01M 5/0025* (2013.01); *G01M 5/0033* (2013.01); *G01M 5/0091* (2013.01); *G01M 11/085* (2013.01)

(58) Field of Classification Search
 CPC .................................................. G01M 5/0066
 (Continued)

(56) References Cited

U.S. PATENT DOCUMENTS

| 4,927,232 A | * | 5/1990 | Griffiths | G01B 11/18 |
| | | | | 250/227.24 |
| 5,549,000 A | * | 8/1996 | Brown | G01V 1/001 |
| | | | | 73/587 |

(Continued)

FOREIGN PATENT DOCUMENTS

| GB | 2458460 | 9/2009 |
| JP | 2011/007689 | 1/2011 |

(Continued)

OTHER PUBLICATIONS

Canning, J., "Fiber Gratings and Devices for Sensors and Lasers," Lasers and Photonics Reviews, Aug. 2008, vol. 2 Issue 4, pp. 275-289.

(Continued)

*Primary Examiner* — Tarifur Chowdhury
*Assistant Examiner* — Omar Nixon
(74) *Attorney, Agent, or Firm* — ExxonMobil Upstream Research Company—Law Department

(57) ABSTRACT

Methods and systems for providing real-time monitoring of a metal surface are provided herein. The system includes a fiber-optic cable disposed alongside a length of a wall that includes the metal surface. A laser source is attached to the fiber-optic cable to transmit light through the fiber-optic cable. An acoustic source is configured to generate acoustic signals in the metal surface, wherein the acoustic signals interact with the fiber-optic cable and influence characteristics of the light. A receiver is attached to the fiber-optic cable to detect the light. The system also includes a signal processing unit configured to determine a location of a change in the metal surface based on changes in the characteristics of the light.

22 Claims, 10 Drawing Sheets

(58) Field of Classification Search
USPC .................................................... 356/73.1
See application file for complete search history.

(56) References Cited

U.S. PATENT DOCUMENTS

| | | | |
|---|---|---|---|
| 5,551,484 | A | 9/1996 | Charboneau |
| 5,974,862 | A | 11/1999 | Lander et al. |
| 6,993,963 | B1 | 2/2006 | Gudmundsson |
| 7,564,540 | B2 | 7/2009 | Paulson |
| 7,918,126 | B2 | 4/2011 | McStay et al. |
| 7,953,828 | B2 | 5/2011 | Huaguang et al. |
| 8,127,801 | B2 | 3/2012 | Brower |
| 8,131,121 | B2 | 3/2012 | Huffman |
| 8,326,540 | B2 | 12/2012 | Hull et al. |
| 2002/0125413 | A1 | 9/2002 | Saini |
| 2003/0033870 | A1* | 2/2003 | Shah ............... G01N 29/11 73/299 |
| 2003/0094281 | A1* | 5/2003 | Tubel ............... E21B 47/00 166/250.03 |
| 2004/0261547 | A1 | 12/2004 | Russell et al. |
| 2005/0061076 | A1 | 3/2005 | Kim |
| 2005/0283276 | A1 | 12/2005 | Prescott et al. |
| 2006/0225507 | A1* | 10/2006 | Paulson ............... F17D 5/02 73/592 |
| 2008/0260324 | A1 | 10/2008 | Takahashi et al. |
| 2009/0078283 | A1* | 3/2009 | Phipps ............... F16L 55/38 134/8 |
| 2009/0114386 | A1 | 5/2009 | Hartog et al. |
| 2010/0002983 | A1 | 1/2010 | Kopp et al. |
| 2010/0011865 | A1 | 1/2010 | Saxena et al. |
| 2010/0229662 | A1 | 9/2010 | Brower |
| 2010/0284000 | A1 | 11/2010 | Xu |
| 2010/0315630 | A1 | 12/2010 | Ramos et al. |
| 2011/0007996 | A1* | 1/2011 | Huffman ............ G01M 5/0025 385/13 |
| 2011/0093220 | A1 | 4/2011 | Yang et al. |
| 2011/0161038 | A1 | 6/2011 | Sutherland |
| 2011/0194107 | A1 | 11/2011 | Hartog et al. |
| 2012/0099097 | A1 | 4/2012 | Coupe et al. |
| 2012/0111104 | A1 | 5/2012 | Taverner et al. |
| 2012/0170610 | A1 | 7/2012 | Ramos et al. |
| 2012/0176606 | A1 | 7/2012 | Zadorozhny et al. |
| 2012/0180552 | A1 | 7/2012 | Calvo et al. |
| 2012/0287749 | A1 | 11/2012 | Kutlik et al. |
| 2013/0129275 | A1 | 5/2013 | Giurgiutiu et al. |
| 2014/0056101 | A1* | 2/2014 | Vu ............... E21B 47/0005 367/35 |

FOREIGN PATENT DOCUMENTS

| | | | |
|---|---|---|---|
| WO | WO 2006/064284 | 6/2006 | |
| WO | WO 2008/059202 | 5/2008 | |
| WO | WO 2009/068905 | 6/2009 | |
| WO | WO 2010/051553 | 5/2010 | |
| WO | WO 2012/028274 | 3/2012 | |
| WO | WO 2012/175954 | 12/2012 | |
| WO | WO 2012175954 A1 * | 12/2012 | ............ F17D 5/005 |

OTHER PUBLICATIONS

Fink, Mathias, "Time-reversed acoustics," Scientific American, Nov. 1999, vol. 281 Issue 5, pp. 91-97.

Kim, S. et al., "Application of a Time Reversal Process to Baseline-Free Structural Monitoring," Int'l Workshop on Structure Monitoring, Stanford, CA, Sep. 15-17, 2005, pp. 574-581.

Kulkarni, M.G. et al., "Offshore Pipeline Leak Detection System Concepts and Feasibility Study," Proceedings of the 22$^{nd}$ International Offshore and Polar Engineering Conference, Rhodes, Greece, Jun. 17-22, 2012, pp. 381-388.

Park, Hyun Woo et al., "Time reversal active sensing for health monitoring of a composite plate," *Journal of Sound and Vibration*, Apr. 17, 2007, vol. 302 Issues 1-2, pp. 50-66.

* cited by examiner

REAL-TIME MONITORING OF A METAL SURFACE

CROSS-REFERENCE TO RELATED APPLICATION

This application claims the benefit of U.S. Provisional Application No. 61/975,590, filed Apr. 4, 2014, the entirety of which is incorporated by reference herein.

FIELD

The present techniques generally relate to monitoring the integrity of objects and, more particularly, to real-time monitoring of the integrity of metal objects such as conduits, including their surfaces and wall thickness.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

Like other modes of transportation that are vital to the U.S. and world economy, pipelines are essential in linking points of production to points of consumption. Pipelines provide an efficient means of transporting crude oil and natural gas from production fields to refineries and processing plants and of distributing petroleum products and natural gas to the consumer. In fact, U.S. pipelines move nearly two-thirds of the petroleum and natural gas products transported annually.

Due to its importance in providing access to crude oil, refined fuel, and other materials, it is of importance that a pipeline undergoes limited integrity failures. Such integrity failures may be facilitated by internal issues such as material defects (e.g., leaks or cracks), outside forces (e.g., destruction by human error), or corrosion.

As one of the primary threats to pipeline integrity, operating experience has shown that inherent corrosiveness of many transported fluids can reduce wall thickness or potentially induce material defects. Currently, the oil and gas industry uses pipeline inspection tools such as in-line-inspection (ILI) tools or pigs to assess the internal condition of a pipeline for corrosion-induced failures. However, many of the current techniques call for accessing pipeline integrity only at periodic intervals for corrosion that has already occurred. Thus, the data provided by the inspection of the pipeline may merely be a lagging indicator of corrosion since any detrimental effects may have already taken place. Furthermore, such sporadic inspections may overlook existing corrosion, thus possibly leading to significant repairs to the pipeline.

Another method of monitoring pipelines for hazardous conditions may include the installation of sensors along the pipeline length. The installation of conventional sensors may provide information at various local points and therefore, may require a large number of sensors to cover the total length of the pipeline. Nevertheless, corrosion mechanisms that affect the integrity of the pipeline, such as microbial induced corrosion, may be localized and not readily detected by point sensors.

U.S. Patent Application Publication 2004/0261547 to Russell et al. discloses a method, an apparatus, and an article of manufacture for detecting a physical condition in a pipeline. The technique includes detecting a physical condition in a pipeline by obtaining vibration data from the pipeline which is representative of the physical condition. The physical condition may be corrosion in the pipeline.

U.S. Patent Application Publication 2012/0099097 to Coupe et al. discloses determining the wall thickness of a structure such as a metallic pressurized pipe. The system includes an optical fiber having a plurality of Fiber Bragg Gratings (FBGs), and a mounting for securing the FBGs over discrete portions of the exterior surface of the pipe such that strain in the pressurized pipe wall is transmitted to the FBGs. The system further includes a light source and a light sensor coupled to an end of the optical fiber. The light sensor converts light reflected back from the FBGs into electrical signals that a digital processor converts into strain measurements. The FBGs are mounted around portions of the pipe expected to have significant metal loss as well as portions of the pipe expected to have negligible metal loss. The method includes comparing relative strains at locations with negligible metal loss to those with significant metal loss to accurately determine the thickness of the wall with metal loss, compensating for temperature effects by considering relative strains at areas of the pipe with and without metal loss, and measuring axial strain on the pipe with one or more of the FBGs to correct for at least one of bending and torsion effects on hoop strain.

U.S. Patent Application Publication 2012/0180552 to Calvo et al. discloses a method and an apparatus using low-frequency guided wave and fiber-optic cables to detect intrusion to a pipeline due to external events. The apparatus includes an acoustic source, a laser light source, a pressure-sensitive optical fiber including a first end and a second end. The second end is connected to the laser light source and oriented toward the acoustic source. The laser light source generates a laser pulse traveling through the pressure-sensitive optical fiber toward the acoustic source. The laser pulse includes a time-of-flight. The acoustic source generates an acoustic wave. The acoustic wave includes a plurality of evanescent wave fronts. The plurality of evanescent wave fronts, upon scattering from a non-uniform material region, radially contracts the pressure-sensitive optical fiber to alter the time-of-flight of the laser pulse along the pressure-sensitive optical fiber by increasing the fiber length.

U.S. Pat. No. 8,131,121 to Huffman discloses a fiber surveillance system for monitoring a pipeline. The surveillance system includes an optical fiber acoustically coupled to the pipeline to detect acoustic signals associated with vibrations or other activity near or from the pipeline. Optical energy is injected into the optical fiber and an optical detector receives an optical return-signal having certain characteristics resulting from vibrations impinging on the optical fiber. An analyzer is configured to determine operating information about the pipeline based on the optical return-signal. Two or more fibers can be acoustically coupled to the pipeline and arranged in varying configurations to yield greater resolution.

There are several existing technologies that may facilitate the monitoring of a pipeline for intrusions, including the use of acoustic or fiber-optic techniques. However, in the pipeline transportation industry, advances in pipeline monitoring (of intrusions) and mechanical integrity with and over existing technologies can result in significant economic benefit. Indeed, there is an ongoing need for the continuous improvement of monitoring of pipeline integrity and in promoting pipeline performance.

SUMMARY

An embodiment described herein provides a system for providing real-time monitoring of a metal surface. The system includes a fiber-optic cable disposed alongside a length of a wall comprising the metal surface. A laser source is attached to the fiber-optic cable and is configured to transmit light through the fiber-optic cable. An acoustic source is configured to generate acoustic signals in the metal surface, wherein the acoustic signals interact with the fiber-optic cable and influence characteristics of the light. A receiver is attached to the fiber-optic cable and is configured to detect the light. A signal processing unit is configured to determine a location of a change in the metal surface based on changes in the characteristics of the light.

Another embodiment provides a system for real-time monitoring of a pipe that conveys hydrocarbons. The system includes a fiber-optic cable disposed alongside a pipe wall of a pipe that conveys hydrocarbons. The system includes a laser source attached to the fiber-optic cable and configured to transmit a light pulse through the fiber-optic cable. The system includes an acoustic source configured to generate acoustic signals in the pipe wall that interact with the fiber-optic cable and influence characteristics of the light pulse in the fiber-optic cable. The system includes a receiver attached to the fiber-optic cable and configured to detect the light pulse. The system also includes a signal processing unit configured to determine a location an intrusion in the pipe wall based on changes in the characteristics of the light pulse.

Another embodiment provides a method for monitoring changes in a wall of a pipe. The method includes disposing a fiber-optic cable alongside a length of the pipe wall. A light source is attached to the fiber-optic cable to transmit light through the fiber-optic cable. An acoustic source is provided adjacent to, or within, the pipe to generate acoustic signals within the pipe wall that interact with the fiber-optic cable to influence characteristics of the light pulse. A receiver is attached to the fiber-optic cable to detect the light from the fiber-optic cable. A signal processing unit is coupled to the receiver to determine changes between the light originating from the light source with the light detected at the receiver. An intrusion on the pipe wall is located based, at least in part, on the changes.

DESCRIPTION OF THE DRAWINGS

The advantages of the present disclosure are better understood by referring to the following detailed description and the attached drawings, in which.

DETAILED DESCRIPTION

Figure 1A:
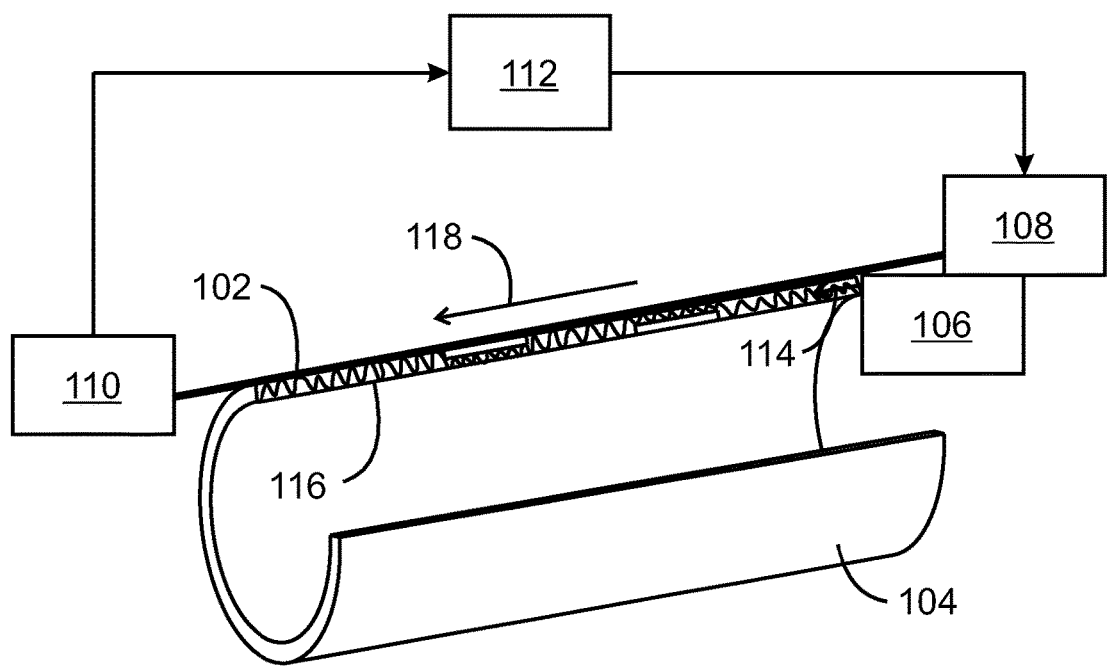
FIG. 1A is a schematic of a real-time monitoring system including a fiber-optic cable attached to an external portion of a pipeline and a fixed acoustic source attached to a portion of a pipeline in accordance to one or more embodiments of the present disclosure.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

As mentioned, there are several existing technologies that may facilitate the monitoring of a pipeline for intrusions, including the use of acoustic or fiber-optic techniques. However, these techniques generally monitor only specific areas of the pipeline and do not provide substantial monitoring along the entire pipeline length. Moreover, such conventional techniques do not continue to provide fiber-optic monitoring when a portion of the fiber-optic cable has been disrupted due to damage or failure. Conversely, embodiments of the present techniques provide for a system that gives substantially uninterrupted, real-time monitoring for a full-length or near-full length of a pipeline or lengthy segment of a pipeline. Monitored lengths of a pipeline may be more than one hundred (100) kilometers, more than five hundred (500) kilometers or more than a thousand (1000) kilometers.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The term "fiber-optic cable," "fiber-optical cable," or "optical fiber cable" refers to a cable containing one or more optical fibers. The optical fiber elements are typically individually coated with plastic layers and contained in a protective tube suitable for the environment where the cable will be deployed. A fiber-optic cable may be adapted to detect various changes and intrusions of a pipeline by sensing temperature, strain, vibrations and even sound and may act as a guide to guide an optical signal at one end of a fiber-optic cable to another end of the cable.

The term "oil" may refer to liquid hydrocarbons, also called petroleum, whether unrefined (i.e. crude oil) or processed in a refinery to manufacture an end-use product (refined petroleum product).

The term "natural gas" or "gas" may refer to a mixture of gaseous hydrocarbons, primarily methane, used for fuel and manufacturing feedstock.

The term "phase-locked loop" or "phase lock loop (PLL)" refers to a control system that generates an output signal whose phase is related to the phase of an input signal.

The term "Time of Flight (TOF)" refers to a method that measures the time that it takes for a signal, such as an acoustic signal, or an electromagnetic signal, to travel a distance through a medium. In optical interferometry, the path-length difference between sample and reference arms can be measured by TOF methods, such as frequency modulation followed by phase shift measurement or cross correlation of signals. Such methods are used in laser radar and laser tracker systems for medium to long range measurement of distances.

The present techniques provide for methods and systems for real-time monitoring of metal surfaces and underlying wall thickness. The metal surfaces monitored may include an interior surface and an exterior surface of an item, such as a pipe, vessel, or ship's hull, among others. The monitoring may be directed to a wall having the two surfaces and a thickness there between.

Various embodiments described herein may provide a real-time monitoring system, including a fiber-optic cable, a laser source, an acoustic source, a receiver, and a signal processing unit, configured to monitor a pipeline for intrusions and changes. The fiber-optic cable facilitates the real-time monitoring of the pipeline by being adjacent or coupled (e.g., attached) to an external surface of the pipeline. As discussed below in certain embodiments, the monitoring system may continue to monitor the pipeline even when portions of the fiber-optic cable are damaged. Further, the monitoring system may be used on a portion or segment of the pipeline, or on the entire length. Moreover, the monitoring may include above ground and below ground segments of the pipeline and may be independently performed in some embodiments.

In the particular case of a pipeline, a distributed fiber-optic cable deployed along the pipeline length may facilitate the continuous monitoring of the pipeline in real time. As explained below, an optical signal may be launched in the fiber-optic cable while an acoustic wave signal is incident on the pipe wall of the pipeline. The incident acoustic wave on the pipe may produce an elastic stress signal on the fiber-optic cable. Pipe wall loss due to corrosion may change the impedance, frequency, time of flight and phase of the elastic stress signal wave, which may be detected by a receiver attached to the fiber-optic cable. Mathematical algorithms may be used to predict change in wall thickness of the pipeline due to corrosion by analyzing time of flight and other acoustic signal data over time. Therefore, optical fibers may be used as sensors to measure corrosion by measuring change in wavelength, and/or transit time of flight in the fiber. As discussed in detail below, the system may include an acoustic source, light source, pressure sensitive optical fiber cable, pressure in-sensitive optical fiber cable, and energy detector (or receiver). The acoustic source may be either a stationary unit or a moving unit.

Early detection of corrosion or other damage in pipelines may decrease maintenance and repair time, for example, by facilitating earlier intervention. Accordingly, real-time monitoring techniques that can monitor a segment of a pipeline or the entire length of the pipeline using fiber-optic cables may assist in early detection. As noted, the monitoring system may continue to utilize the fiber-optic cable to monitor for pipeline wall thickness and pipeline corrosion, erosion, or failures even when a portion of the fiber-optic cable is damaged. Such may be uniquely facilitated, for example, by employing multiple light sources and receivers along the fiber-optic cable. When a portion of the fiber-optic cable becomes damaged, the remaining undamaged portion of the fiber-optic cable may continue to be utilized to sense and collect data.

In general, with a fiber-optic cable, light may propagate within a core of the fiber-optic cable unperturbed along the length of the cable. However, an external event may influence the cable, changing the characteristics of the guided light within the cable. Thus, a fiber-optic cable located proximate to a metal surface can be used as a sensor to measure changes in the metal surface and wall. In operation, the monitoring system via the fiber-optic cable may measure changes in the signal frequencies of the light, time of flight (TOF) of the light, or both, through the fiber-optic cable. A benefit of utilizing fiber-optic cable may include that as a dielectric medium, where the fiber-optic cable may typically be immune to electromagnetic interference originated from other sources.

Additionally, due to its relatively high transmission characteristics, a fiber-optic cable may facilitate monitoring pipelines over long distances, such as with a pipeline used for oil and gas production. Thus, fiber-optic cables as a sensor located external to a pipeline may facilitate a monitoring system to provide substantially uninterrupted monitoring and detection of internal and external intrusions and wall thickness for the entire or significant length of the pipeline. Intrusions may include damage to an object (e.g., pipeline) including corrosion, erosion, pitting, etc. into a surface or wall, and damage in general, such as mechanical or physical damage, loss of coating, stress cracking, and so forth. Lastly, while the discussion herein may focus on monitoring of intrusions impacting wall thickness and integrity of a pipeline, the skilled artisan will recognize that the present techniques may be applicable to monitoring of intrusions, integrity, surfaces, and wall thickness of metal objects other than a pipeline, such as process piping in facilities, metal conduits generally, vessels, containers, machines, and other objects having metal surfaces and a wall.

FIG. 1A is a schematic of a real-time monitoring system including a fiber-optic cable 102 attached to an external portion of a pipeline 104 and a fixed acoustic source 106 attached to a portion of a pipeline in accordance to one or more embodiments of the present disclosure. The pipeline 104 may represent the entire length or segment of a pipeline. As shown in FIG. 1A, a laser source 108 and a receiver 110 may be located at opposite ends or end portions of the pipeline 104. A signal processing unit 112 may couple the laser source 108 and the receiver 110.

In operation, the acoustic source 106 may emit an acoustic wave signal 114 for transmission, such as pressure waves or guided waves, through the pipeline 104. A pressure wave is a type of elastic wave that may travel through a continuum and is formed from alternating compressions and rarefactions. In general, the continuum may be composed of gases (as sound waves), liquids, solids, the Earth, or any combination thereof. The acoustic wave signal may be selected from sound waves, pressure waves and combinations thereof.

A guided wave may be defined as a type of wave having energy concentrated near a boundary, or between substantially parallel boundaries. Guided waves remain generally contained in a wave-guide, may travel large distances, and may be of various types depending on mode of propagation, for example. Lamb waves are one type of guided waves with a wavelength generally in the same order of magnitude as a thickness of a pipe. Due to their in-plane motion, Lamb waves can be used as a means to detect both superficial and internal flaws of a structure in certain embodiments. Rayleigh waves are another type of guided waves, and are generally constrained to the surface. Love waves are guided wave traveling in layered materials, whereas Stoneley waves are guided waves constrained to the material interface and are applicable while looking for coating disbandment and/or corrosion under insulation (CUI), for instance. In one or more embodiments, various types of wave may be used as the acoustic wave signal 114 to increase the sensitivity and reliability of the real-time monitoring system.

The use of a specific wave type may depend on several factors including pipe thickness, pipe diameter, pipe coating, pipe location, fluid properties, among other characteristics of the pipeline 104. To perform efficient damage detection, it may be important to decide the mode(s) and frequency-thickness region(s) to be used. The defect sensitivity of different modes (in different frequency-thickness regions) is a parameter that may facilitate the determination of the best or beneficial testing regime for a particular defect type. It should be noted that the use of low frequency guided waves may allow for wave propagation over longer distances with relatively low signal attenuation.

As the acoustic wave signal 114 leaves the acoustic source 106, the acoustic wave signal 114 may enter into the pipeline 104 and be partially absorbed or partially reflected in the pipeline 104. Thus, the pipeline 104 may act as an acoustic wave carrier. If an intrusion, such as corrosion, is located within the wall 116 of the pipeline 104, on the surface of the pipeline 104, or a combination of both, the acoustic wave signal 114 may be distorted due to contact with the non-homogeneous intrusion.

Simultaneously, the laser source 108, located outside of the pipeline 104, may transmit an optical signal 118, such as a continuous beam or a laser pulse, into the fiber-optic cable 102. As shown in FIG. 1A, the single fiber-optic cable 102 may be a pressure-sensitive fiber cable. The laser source 108 may be a light-emitting diode, a modulator, or any type of optoelectronic device. The optical signal 118 may propagate in the core of the fiber-optic cable 102 unperturbed.

However, the distortion of the acoustic wave signal 114 caused by changes in the pipeline 104, e.g., corrosion, may influence the characteristics of the optical signal 118 traveling through the fiber-optic cable 102. In operation, the fiber-optic cable 102 may act as a sensor by detecting the changes in the characteristics of the optical signal 118 as caused by the acoustic wave signal 114. The data taken from the fiber-optic cable 102 may be used to provide insight into changes in the pipeline 104, for example, by measuring the change in the signal frequencies of the optical signal 118, the transit of time of flight (TOF) of the optical signal 118, or both, as discussed herein. The loss of dimension in the wall 116 of the pipeline 104 due to the intrusion may also change the impedance, amplitude, signal phase, among other characteristics of the optical signal 118.

The optical signal 118 transmitted through the cable 102 may be detected and received by the receiver 110, located external to the pipeline 104. In operation, the receiver 110 may detect the optical signal 118, and send the corresponding electrical signal to the signal processing unit 112, such as a phase locked loop. Thus, by comparing the discrepancy between the original optical signal 118 and the detected signal, the presence and location of an intrusion may be detected. The receiver 110 may be a photodiode, a phototransistor, or a photomultiplier.

In one or more embodiments, mathematical algorithms may aid in predicting the change in the wall thickness of the pipeline 104 by analyzing signal frequencies, TOF, or other signal data over a length of time. Such algorithms may use a Fast Fourier Transform (FFT) to facilitate analysis of the signal data and to extract information from the data. The FFT algorithm may promote analysis of a received signal in frequency domain by discretizing the received signal. The technique may decompose the selected waveform signals into sinusoids of different frequencies. Perturbations in the received signal can be identified by comparing the frequency peaks with the input signal. Discretization of the detected signal into small packets, e.g., periods of time, allows the algorithm to find the location based on time and frequency information. Specific features may yield more information at one frequency than another, therefore, FFT filtering of the signal can bring out details that may not be visible with conventional time domain analysis. It should be noted that the fiber-optic cable technology may be utilized not only to monitor for the intrusion of corrosion but may also detect leaks, cracks, material defects, external forces caused by human error, or other failures that may interrupt pipeline access.

Figure 1B:
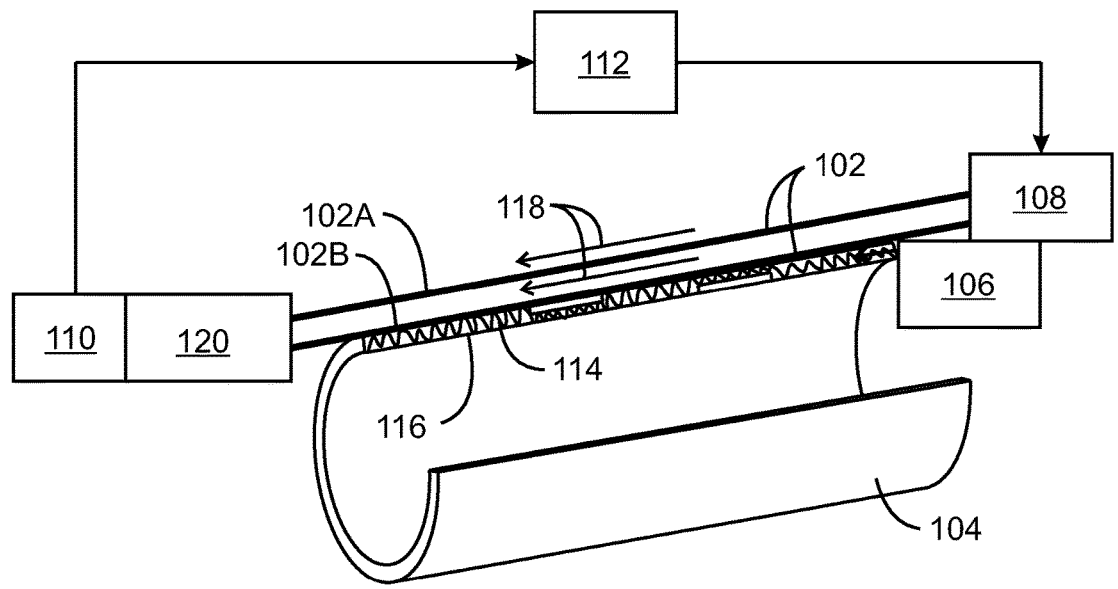
FIG. 1B is a schematic of a real-time monitoring system including several fiber-optic cables and a fixed acoustic source attached to a portion of a pipeline in accordance to one or more embodiments of the present disclosure.

FIG. 1B is a schematic of a real-time monitoring system including several fiber-optic cables 102 attached to an external portion of a pipeline 104 and a fixed acoustic source 106 attached to a portion of a pipeline in accordance to one or more embodiments of the present disclosure. As shown in FIG. 1B, a laser source 108 and a receiver 110 are located at opposite ends of the pipeline 104, where a signal processing unit 112 may couple the laser source 108 and the receiver 110. The acoustic source 106 may emit acoustic wave signals 114 for transmission through the pipeline 104.

The laser source 108 transmits optical signals 118, such as a light wave or a laser pulse, through the fiber-optic cables 102. The fiber-optic cables 102 may include a first fiber-optic cable 102A that is pressure sensitive and a second fiber-optic cable 102B that is pressure-insensitive. In one or more embodiments, a reference wave may be transmitted through the fiber-optic cable 102B that is a pressure-insensitive cable, and the testing wave may be transmitted through the pressure-sensitive fiber-optic cable 102A. An acoustic wave signal 114 travelling down the wall 116 of the pipeline 104 may alter the signal frequencies or TOF of the optical signals 118 propagating in the first fiber-optic cable 102A, due to the pressure sensitivity.

The receiver 110 includes an interferometer 120. The interferometer 120 may determine interference patterns between a reference wave and a testing wave or between two parts of a test wave to determine wavelengths and wave velocities, to measure very small distances and thicknesses, or to calculate indices of refraction, among other determinations.

The receiver 110, located at an opposite end or at an end portion of the fiber-optic cables 102, receives and detects the interference patterns from the differences between the characteristics of the optical signals 118 detected from the fiber-optic cables 102.

The interference patterns detected by the receiver 110 may be converted to electrical signals and then relayed to the signal processing unit 112. The signal processing unit 112 may be utilized to measure the electrical signals transmitted by the receiver 110. In operation, the signal processing unit 112 may analyze the interference patterns between the various fiber-optic cables 102 to detect and locate changes in the wall thickness of the pipeline 104 due to intrusions.

Figure 2A:
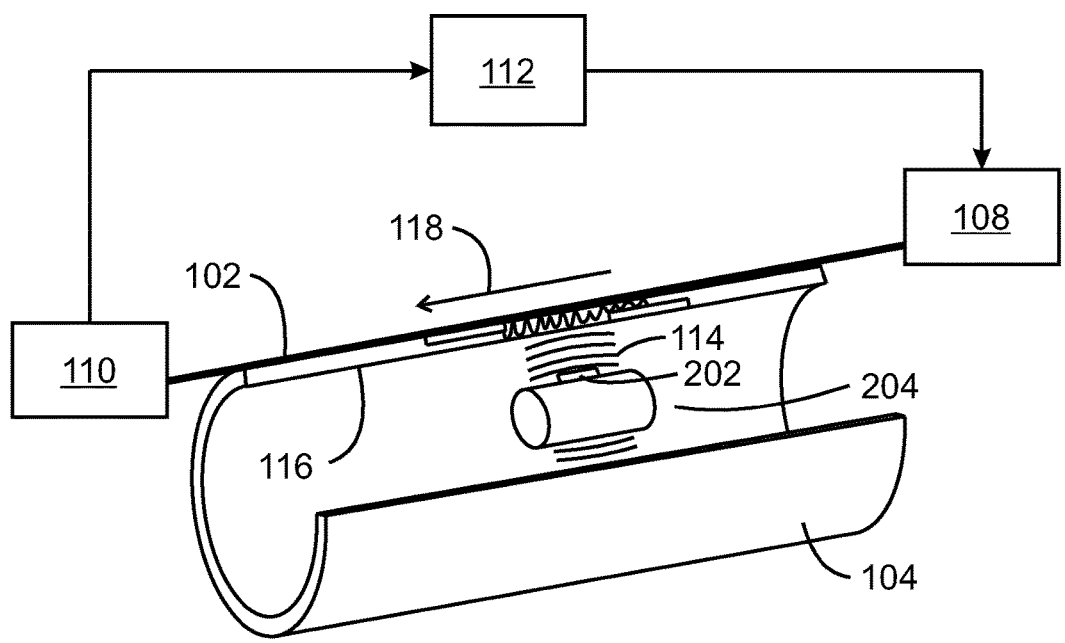
FIG. 2A is a schematic of a real-time monitoring system including a fiber-optic cable attached to a portion of a pipeline and with a moving acoustic source located inside an internal portion of the pipeline in accordance to one or more embodiments of the present disclosure.

FIG. 2A is a schematic of a real-time monitoring system including a fiber-optic cable 102 attached to a portion of a pipeline 104 and with a moving acoustic source 202 located inside an internal portion 204 of the pipeline in accordance to one or more embodiments of the present disclosure. Like numbers are as described with respect to FIG. 1A. As shown in FIG. 2A, a laser source 108 and a receiver 110 are located at opposite ends or end portions of the pipeline 104. The laser source 108 and the receiver 110 may be coupled together by a signal processing unit 112. For an acoustic source to move within and through the length of the pipeline 104, the moving acoustic source 202 may be attached to a device, e.g., a cleaning pig, to travel with pipeline fluid, or attached to a ball to roll inside of the pipeline 104 under fluid pressure, and so forth. The fiber-optic cable 102, such as a pressure-sensitive fiber cable, may be attached to an external portion of the pipeline 104. As the acoustic source 202 moves along the length of the pipeline 104, an acoustic wave signal 114 may be oriented at various angles as the acoustic wave signal 114 is transmitted throughout the pipeline 104. As the acoustic wave signal 114 moves through the pipeline 104, it may interact with the fiber-optic cable 102, changing the characteristics of the optical signals 118 transmitted by the laser source 108. The receiver 110 may detect the optical signals 118 and transmit a corresponding electrical signal to the signal processing unit 112. The signal processing unit 112 may perform a time reversal analysis to identify and locate an intrusion.

Figure 2B:
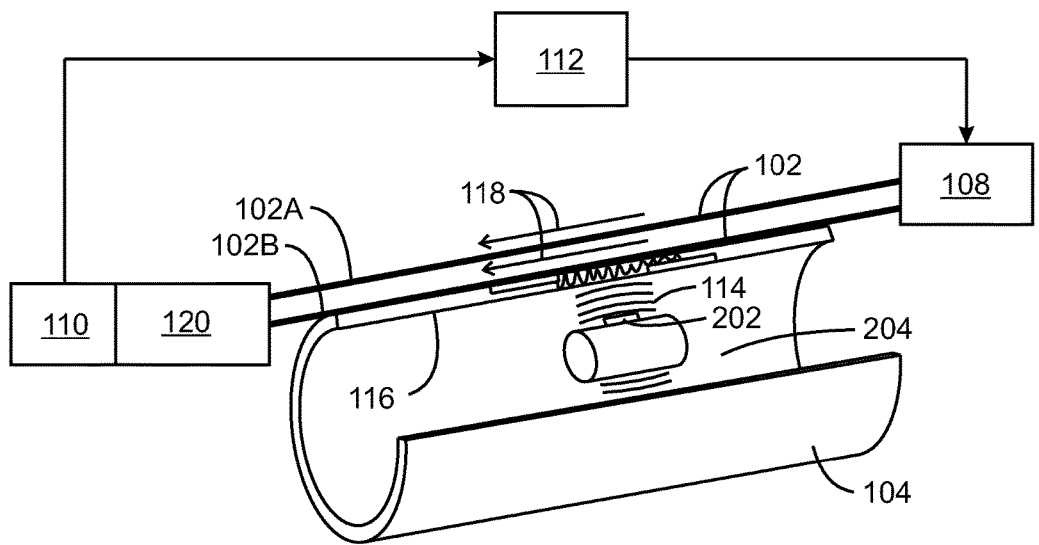
FIG. 2B is a schematic of a real-time monitoring system including several fiber-optic cables and a moving acoustic source located in an internal portion of the pipeline in accordance to one or more embodiments of the present disclosure.

FIG. 2B is a schematic of a real-time monitoring system including several fiber-optic cables 102 attached to an external portion of a pipeline 104 and with a moving acoustic source 202 located in an internal volume 204 of the pipeline 104 in accordance to one or more embodiments of the present disclosure. Like numbers are as described with respect to FIG. 1B. A signal processing unit 112 may couple the receiver 110 with the laser source 108. As shown in FIG. 2B, the moving acoustic source 202 emits acoustic wave signals 114 that pass through the pipeline 104. The laser source 108 may transmit optical signals 118, such as a light wave or laser pulse, through the fiber-optic cables 102. The acoustic wave signals 114 may be transmitted through the pipeline 104 to the fiber-optic cables 102A, 102B where the acoustic wave signals 114 may interact with the first fiber-optic cable 102A, e.g., due to pressure sensitivity, altering the characteristics of the optical signal 118.

As discussed herein, an interferometer 120 may determine an interference pattern between the optical signals in the fiber-optic cables 102A and 102B. The interference patterns may be detected by the receiver 110 and converted to electrical signals. The electrical signals may then be relayed to the signal processing unit 112. The signal processing unit 112 may be utilized to measure the electrical signals transmitted by the receiver 110. In operation, the signal processing unit 112 may analyze the interference patterns between the various fiber-optic cables 102 to detect and locate changes in the wall thickness of the pipeline 104 due to intrusions.

Figure 3A:
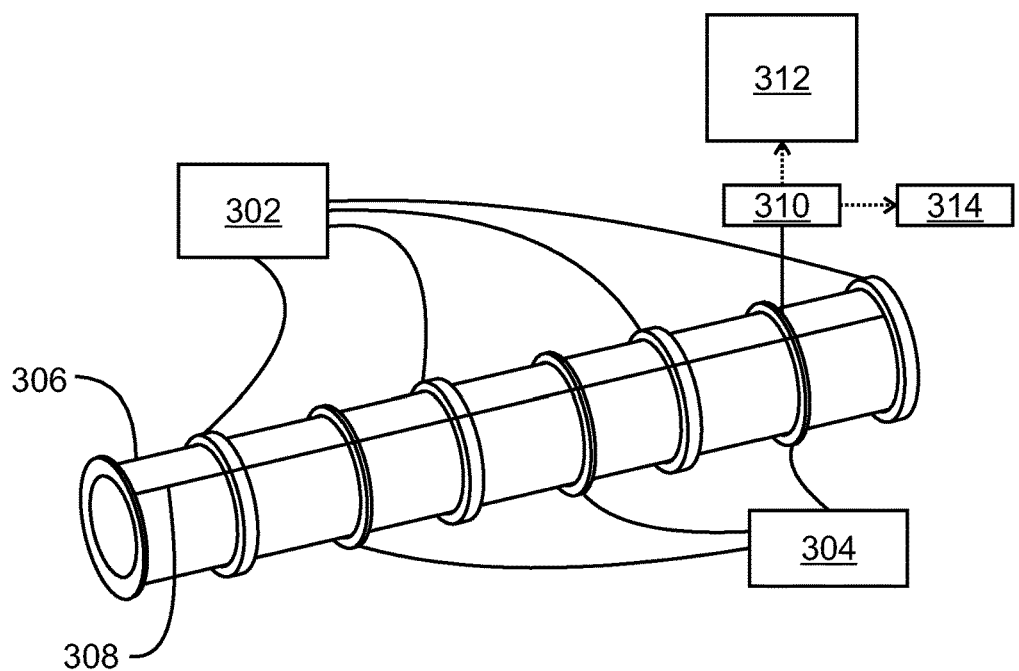
FIG. 3A is a drawing of multiple laser sources and multiple receivers located external to a pipeline in accordance to one or more embodiments of the present disclosure.

FIG. 3A is a drawing of a real-time monitoring system having multiple laser sources 302 and multiple receivers 304 located external to a pipeline 306 in accordance to one or more embodiments of the present disclosure. Depending on the length, thickness, diameter, coatings, and surrounding conditions, multiple laser sources 302 and multiple receivers 304 may be disposed along or attached to the pipeline 306. The use of multiple laser sources 302 and receivers 304 distributed along the pipeline length may facilitate continuous transmission of optical signals within a fiber-optic cable 308, and monitoring of intrusions in the pipeline 306, even if portions of the fiber-optic cable 308 are damaged or out of service. In other words, the multiple receivers 304 may continue to convert the optical signals to electrical signals and to provide data concerning the detection of intrusions using the undamaged portions of the fiber-optic cable 308. The receivers 304 may also have a data logger with plug-in capability 310 to transmit the electrical signals to a signal processing unit 312 and to download the data for the electrical signals using a remote operating vessel (ROV) or diver 314. The data logger may store all signal information in internal memory, which can be downloaded for present or later use. Data loggers may also have wireless capability to transmit the information to a surface.

Figure 3B:
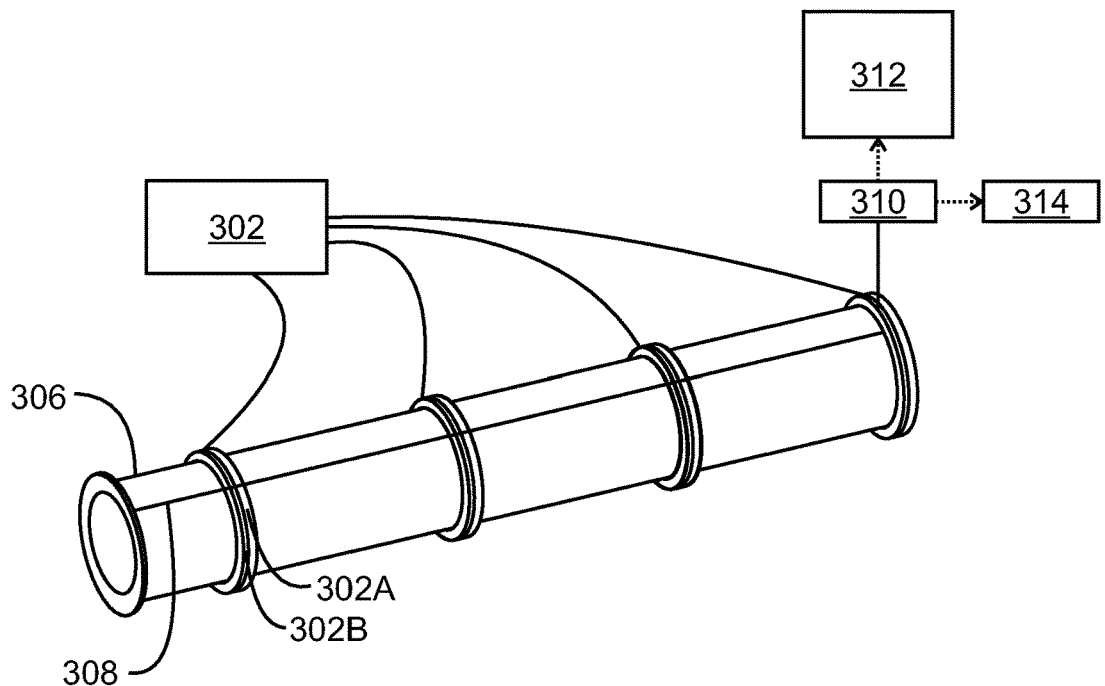
FIG. 3B is a drawing of multiple electronic components having dual capabilities located external to a pipeline in accordance to one or more embodiments of the present disclosure.

FIG. 3B is a drawing of multiple electronic components having dual capabilities located external to a pipeline 306 in accordance to one or more embodiments of the present disclosure. As shown in FIG. 3B, the multiple electronic components 302 may facilitate continuous transmitting of optical signals within a fiber-optic cable 308. The multiple electronic components 302 may have dual capabilities such that a laser portion 302A of the electronic component 302 may transmit an optical signal and a receiver portion 302B of the electronic component 302 may receive the optical signal and detect any changes to its characteristics. The multiple electronic components 302 may also have plug-in capability 310 to transmit the optical signals to a signal processing unit 312 and to download the data of the optical signals using a remote operating vessel (ROV) or diver 314.

Figure 4A:
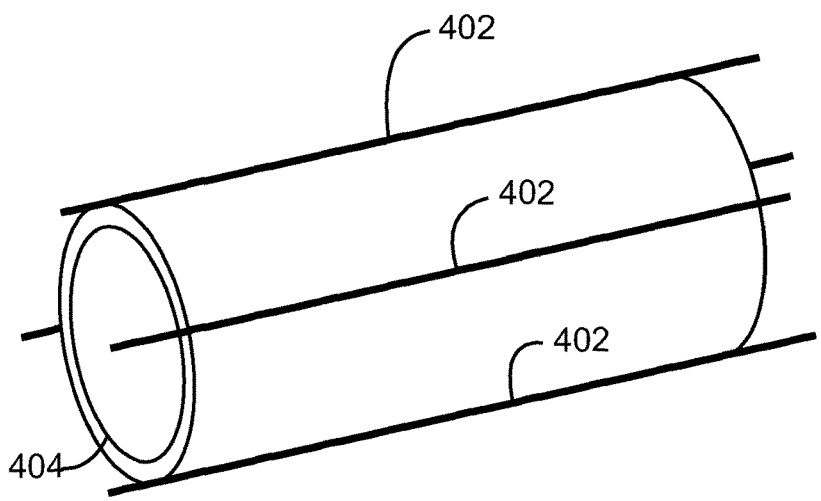
FIGS. 4A-4C are drawings of a pressure sensitive fiber-optic cable attached to a portion of a pipeline in accordance to one or more embodiments of the present disclosure.
Figure 4B:
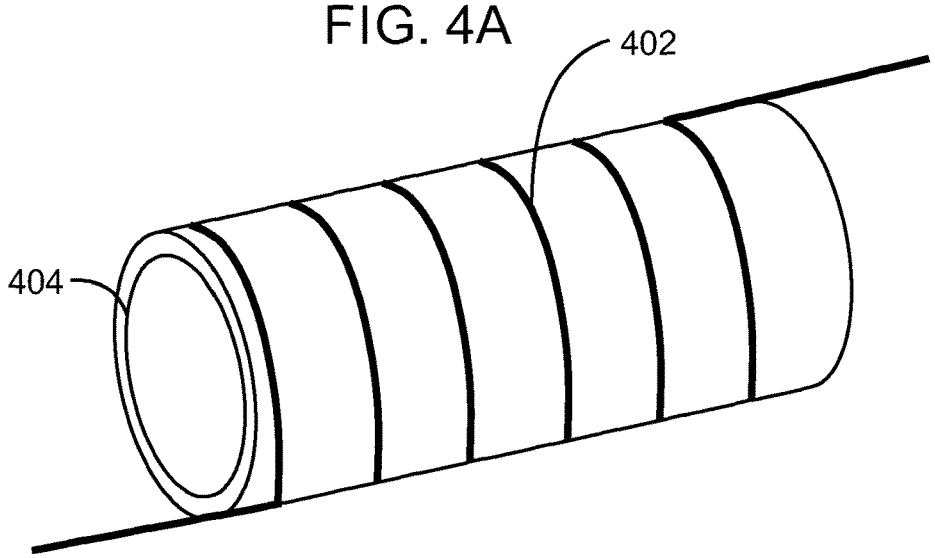
Figure 4C:
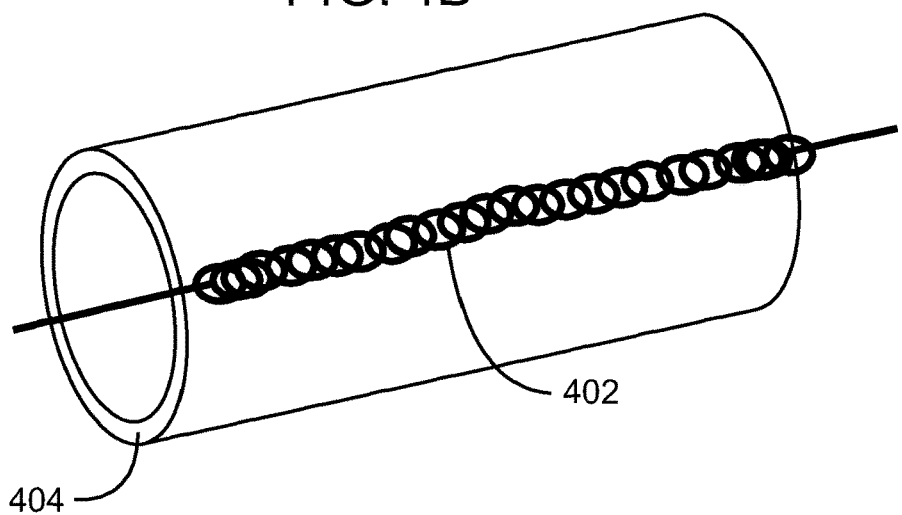

FIGS. 4A-4C are drawings of a pressure sensitive fiber-optic cable 402 attached to a portion of a pipeline 404 in accordance to one or more embodiments of the present disclosure. Various approaches may be utilized to analyze the optical signals received by the receiver and to identify intrusions within the pipeline. In the embodiments shown in FIGS. 4A-4C, a pressure-sensitive fiber-optic cable 402 is distributed along an external length of the pipeline 404. The pressure-sensitive fiber-optic cable 402 may be able to detect locations of intrusions along the pipeline 404 via pressure changes on the fiber-optic cable 402. As shown in FIG. 4A, the pressure-sensitive fiber-optic cable 402 can be provided in straight longitudinal lines along the length of the pipeline 404 and at spaced-apart intervals. Such configuration may aid in avoiding shear stresses upon the fiber-optic cable 402, which may affect the measurements. Further, this arrangement may provide for the detection of intrusions along a greater extent of the pipeline.

As shown in FIG. 4B, the pressure-sensitive fiber-optic cable 402 may be coiled around the pipeline 404. The coil configuration for the cable 402 may provide a reduced diameter fiber-optic cable 402 to facilitate space saving techniques without comprising the quality of the cable 402. As shown in FIG. 4C, the pressure-sensitive fiber-optic cable 402 may be tightly coiled along the pipeline 404. In one or more other embodiments, the pressure-sensitive fiber-optic cable may be embedded within a wall of the pipeline 404. Accordingly, the pipeline 404 may protect the cable 402 from damage, for example, during installation. In one or more other embodiments, the pressure-sensitive fiber-optic cable may be located along an internal surface of the pipeline 404.

Figure 5A:
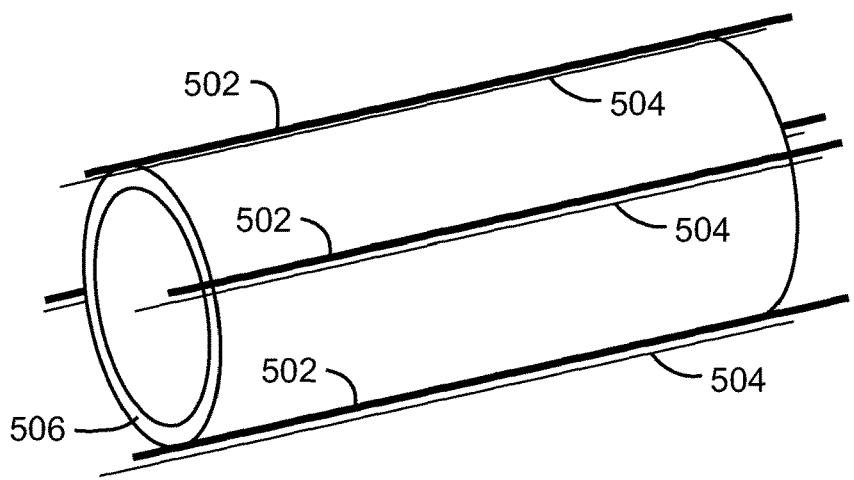
FIGS. 5A-5C are drawings of a pressure sensitive fiber-optic cable and a pressure-insensitive fiber-optic cable attached to a portion of a pipeline in accordance to one or more embodiments of the present disclosure.
Figure 5B:
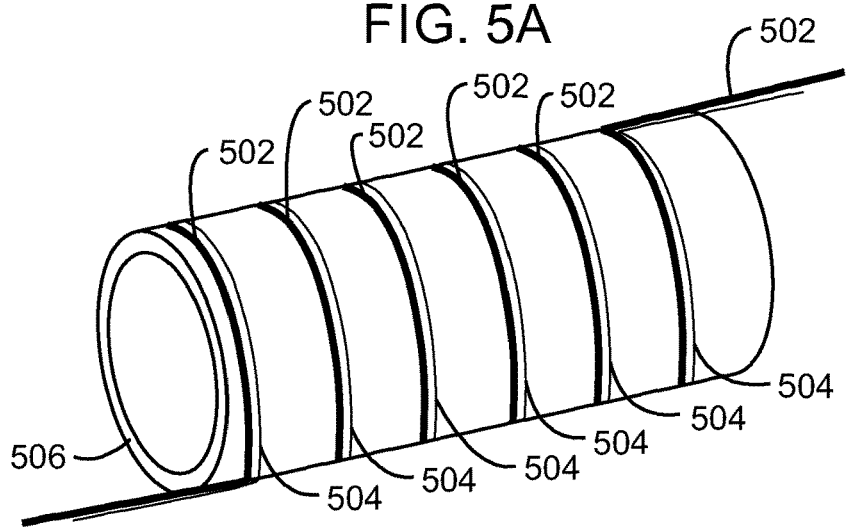
Figure 5C:
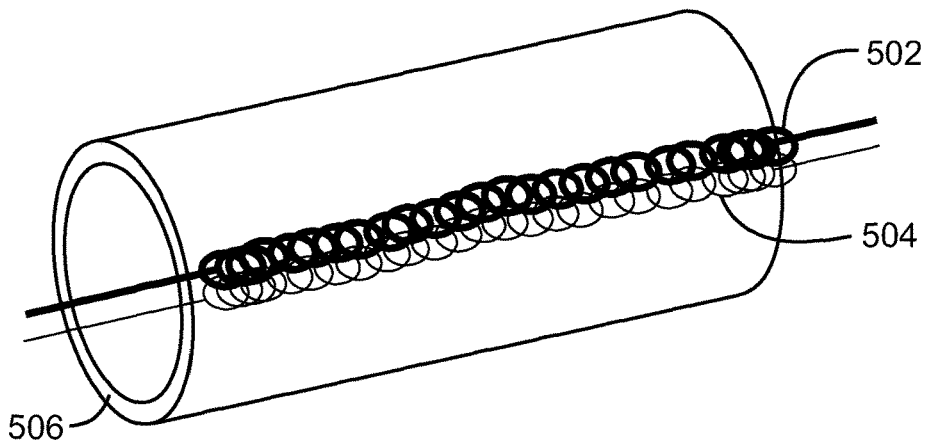

FIGS. 5A-5C are drawings of a pressure sensitive fiber-optic cable 502 and a pressure-insensitive fiber-optic cable 504 attached to a portion of a pipeline 506 in accordance to one or more embodiments of the present disclosure. As previously stated, various approaches may identify intrusions within the pipeline. In the embodiments shown in FIGS. 5A-5C, both a pressure-sensitive fiber-optic cable 502 and a pressure-insensitive fiber-optic cable 504 are distributed along the pipeline 506. Similar to FIGS. 4A and 4B, both cables 502 and 504, as shown in FIGS. 5A and 5B, respectively, can be located horizontally or coiled along an external longitudinal length of the pipeline 506. In one or more other embodiments, cables 502 and 504 may be located within the pipeline 506, either within a wall of the pipeline 506 or along an internal surface of the pipeline 506.

A plurality of fiber-optic cables, for example pressure-sensitive fiber-optic cables, may be used in one or more embodiments. The number of fiber-optic cables may be correlative with dimensions of the metal surface and the sensitivity of the fiber-optic cables.

Figure 6:
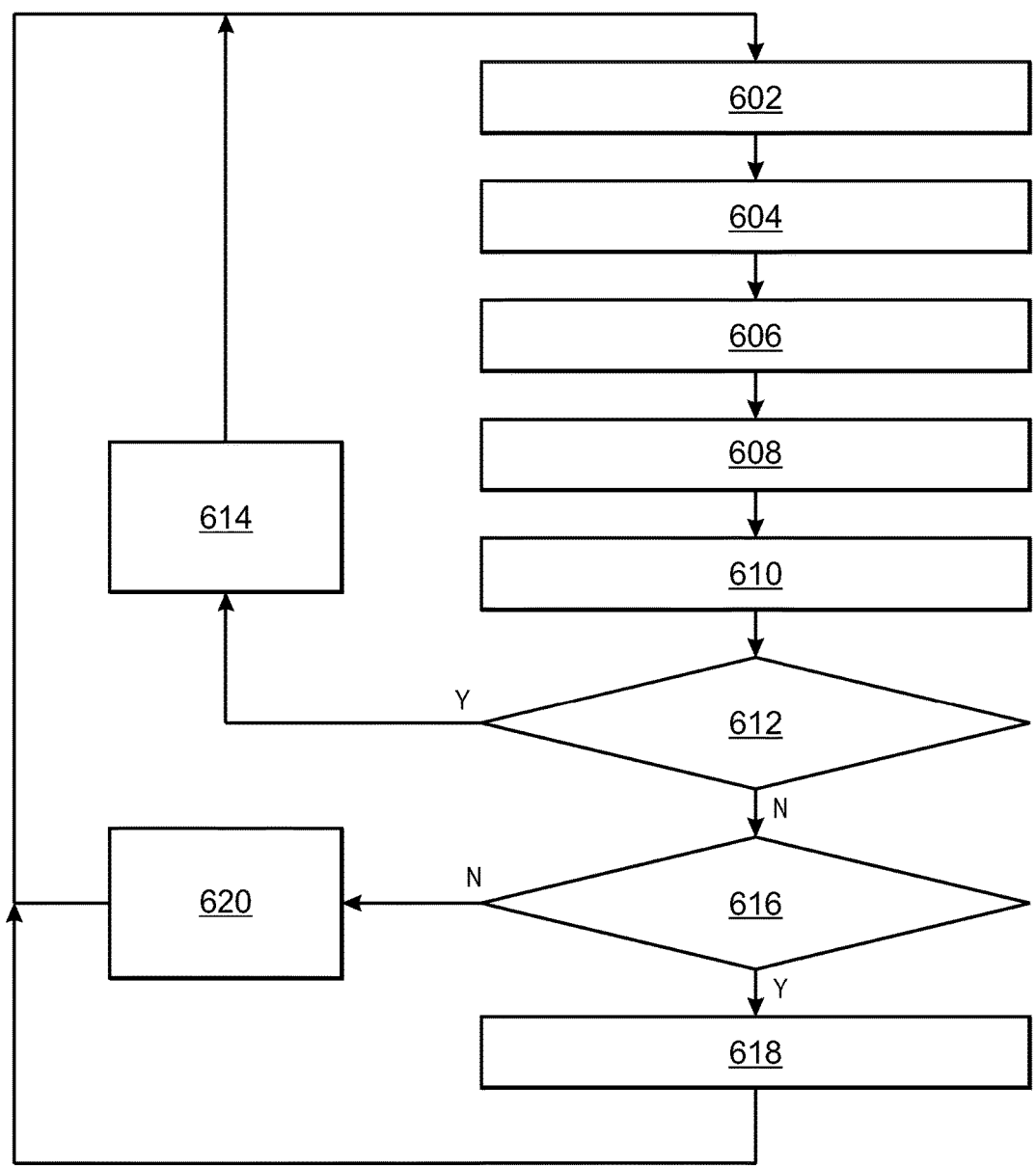
FIG. 6 is a process flow diagram of a method for using a time reversal mirror (TRM) approach including only a pressure-sensitive fiber-optic cable in accordance to one or more embodiments of the present disclosure.

FIG. 6 is a process flow diagram of a method 600 for using a time reversal mirror (TRM) approach including only a pressure-sensitive fiber-optic cable in accordance to one or more embodiments of the present disclosure. The TRM approach includes recording an optical signal for example, using a laser source and a receiver. As used herein, an acoustic source may emit acoustic waves that propagate through a wall structure. The acoustic waves may become distorted by any non-uniformities, such as intrusions, associated with the medium. For example, an acoustic wave may become distorted due to corrosion in a pipeline, causing the acoustic wave to bounce back in a distorted wave pattern. The distorted acoustic wave may affect the optical wave carried by a fiber-optic cable. A receiver may detect and read the distorted optical wave arriving at its location and thus, may feed a signal to a computer pertaining to the distortion.

In the computer, a wave calculation may be used to calculate a reversal of the received optical signal in time. Comparing the results of the wave calculation to the initial wave sent through the fiber-optic cable may locate distortions in the optical signal, identifying the locations of incursions.

At block 602, an optical signal may be transmitted through a pressure-sensitive fiber-optic cable, where the cable may be located external to a pipeline or embedded within the pipeline. At block 604, an acoustic source, fixed to the pipe or moving within the pipe, may emit an acoustic wave signal into the pipeline. The acoustic wave signal may generate an acoustic signal that may be transmitted within the pipeline. Intrusions within the pipeline may cause the acoustic signal to be reflected in random directions. Thus, if the acoustic signal is interrupted due to an intrusion (e.g., corrosion, erosion, etc.) of the pipeline, the optical signal may be distorted and reflected.

The propagation of the optical signal in the fiber-optic cable may then be affected by the reflected acoustic signal. For example, the optical signal may undergo a wavelength shift or a scattering effect, among others. At block 606, the reflected optical signal may be detected at a receiver. At block 608, the reflected optical signal may then be transmitted to a signal processing unit, which can calculate a time reversal of the optical signal. The time reversal approach may locate positions of disturbances that distort the optical signal as a function of time.

In short, one cycle of the TRM approach may correspond to the succession of steps including emission of the acoustic signal, scattering of the acoustic signal leading to modification of optical signal, measuring the optical signal, and time reversal of the optical signal. At block 610, once the optical signal has undergone a complete cycle, the original optical signal may be compared with the time-reversed optical signal. At block 612, the comparisons may determine if any changes in signal frequencies, TOF, or both of the optical signal have occurred.

At block 614, if such changes have occurred, the location and extent of the intrusion based on the changes may be determined and reported. Process flow then resumes at block 602. At block 616, if no changes have occurred, the differences with respect to historical optical signals may be analyzed to determine if an intrusion is developing, for example, due to corrosion.

If differences in the historical optical signals exist, then at block 618 the extent and the location of the intrusion may be determined and reported. Process flow then resumes at block 602. At block 620, a report may be made that no substantial differences have been noted for the optical signal. Process flow may then return to block 602 to restart the process. The determination of an intrusion using the TRM approach may alleviate the need for a reference signal utilized by a pressure-insensitive fiber-optic cable.

Figure 7:
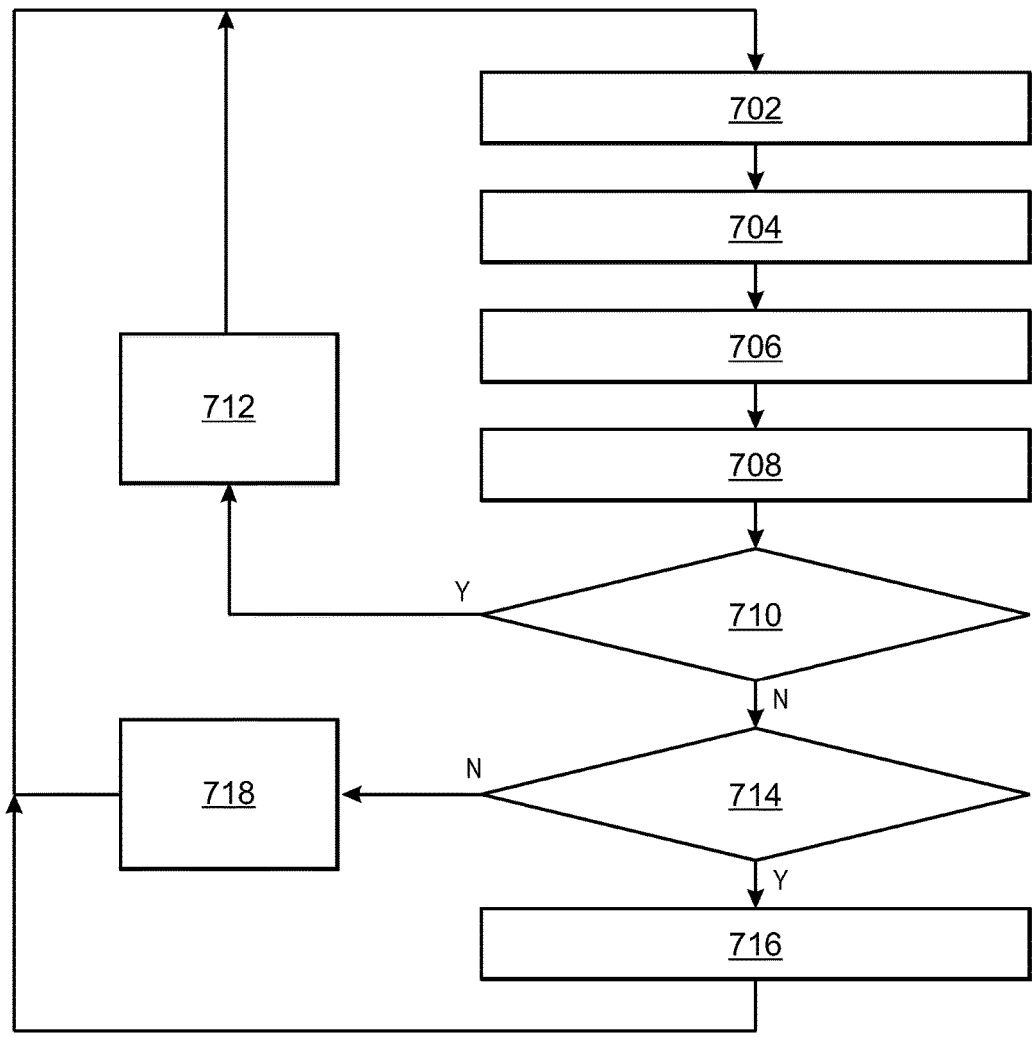
FIG. 7 is a process flow diagram of a method for using a reference signal approach including both a pressure-sensitive fiber-optic cable and a pressure-insensitive fiber-optic cable in accordance to one or more embodiments of the present disclosure.

FIG. 7 is a block diagram of a method for using a reference signal approach including both a pressure-sensitive fiber-optic cable and a pressure-insensitive fiber-optic cable. Both cables may be located at a location external to the pipeline but in close proximity to the pipeline.

At block 702, an optical signal is transmitted through the pressure-sensitive cable and the pressure-insensitive cable. The optical signal transmitted through the pressure-sensitive cable may undergo changes in its characteristics, such as the TOF or signal frequencies, due to scattering of an acoustic wave from an intrusion. Conversely, optical signals transmitted through the pressure-insensitive cable does not undergo any changes in its attributes.

At block 704, an acoustic source, fixed to the pipe or moving within the pipe, may emit an acoustic wave signal into the pipeline. An acoustic signal generated within the pipeline may be interrupted due to an intrusion (i.e., corrosion, erosion) in the pipeline. Thus, the acoustic signal may become distorted and reflected, thus, possibly causing an interference with the characteristics of the optical signal transmitted through the pressure-sensitive cable. The pressure-insensitive fiber-optic cable may provide a reference optical signal to compare with the changed optical signal of the pressure-sensitive fiber-optic cable. At block 706, the optical signals of both the pressure-sensitive and pressure-insensitive fiber-optic cable may be detected by a receiver. If changes in the signal frequencies or the TOF of the optical signal can be determined based on the comparison, then the extent and location of the intrusion can be determined. Thus, at block 708, the reference optical signal and the changed optical signal may be compared. At block 710, the signals may be compared to determine if any changes in the signal frequencies and the TOF of the optical signal has occurred. At block 712, if changes have occurred, then the location and the extent of the intrusion is determined and reported. Process flow then resumes at block 702.

If no changes have occurred in the signal frequencies and the TOF of the optical signal, at block 714, any differences with respect to historical optical signals may be determined. If differences in the historical optical signals exist, then at block 716 the extent and the location of the intrusion may be analyzed and reported. Process flow then resumes at block 702. At block 718, a report may be made that no substantial differences have been noted for the optical signal and process flow resumes at block 702.

Figure 8:
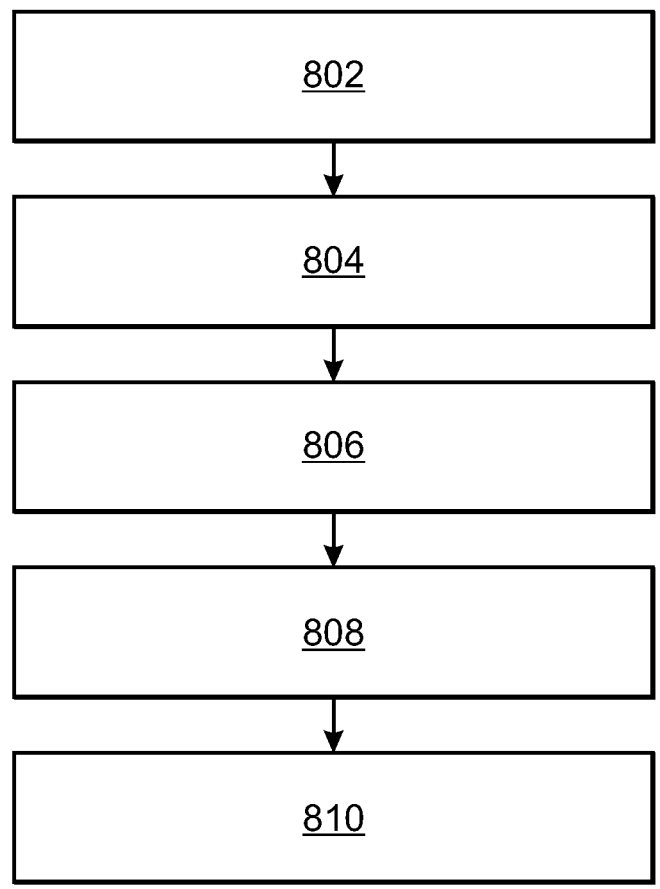
FIG. 8 is a process flow diagram of a method for providing real-time monitoring of an entire length of a pipe for changes in accordance to one or more embodiments of the present disclosure.

FIG. 8 is a block diagram of a method for providing real-time monitoring of an entire length of a pipe for changes. The method begins at block 802 at which a fiber-optic cable is disposed alongside an external length of the pipe. In some embodiments, the fiber-optic cable may be embedded within a liner of the pipe.

At block 804, a laser source may be attached to one end of the fiber-optic cable, where the laser source transmits a light pulse through the fiber-optic cable. The laser source may transmit any type of optical signal that may propagate through the fiber core of the fiber-optic cable. At block 806, an acoustic source may be provided within the pipe to generate acoustic signals that may be transmitted through the pipe. The acoustic signals may be transmitted into the fiber-optic cable so that the signals may influence the characteristics of the light pulse propagating through the fiber-optic cable. The type of acoustic signals used may depend on such factors including pipe thickness, pipe diameter, pipe coating, pipe location, and fluid properties transmitted through the pipe.

At block 808, a receiver may be attached to another end of the fiber-optic cable. In operation, the receiver may detect the changes in the characteristics of the light pulse. The data from the receiver may be further processed in a signal processing unit. At block 810, the signal processing may compare the light pulse exiting the laser source with the light pulse entering the receiver, for example using a time reversal approach, to detect the changes in the characteristics of the light pulse. The changes to the optical signal may be based on intrusions within the pipeline such as corrosion, material defects, or external forces.

When an intrusion in a pipeline occurs, such as corrosion, a certain percentage of the wall thickness may be lost and larger strains may appear in the defective region. One of the major difficulties in adequately monitoring pipelines may stem from the fact that the length of pipeline can be hundreds or thousands of kilometers, either above ground or underground. Thus, conventional fiber-optic sensors may have various difficulties including withstanding a harsh environment or requiring a large number of sensors to cover the entire length of pipeline. However, the fiber-optic technology, as herein disclosed, may embody both survivability and capability in various environmental conditions while facilitating uninterrupted, real-time monitoring of the entire pipeline length.

While the present techniques may be susceptible to various modifications and alternative forms, the embodiments discussed above have been shown only by way of example. However, it should again be understood that the techniques are not intended to be limited to the particular embodiments disclosed herein. Indeed, the present disclosure includes all alternatives, modifications, and equivalents falling within the true spirit and scope of the appended claims.

What is claimed is:

1. A system for real-time monitoring of a pipe, comprising: a fiber-optic cable disposed alongside a length of a wall of the pipe; a laser source attached to the fiber-optic cable, wherein the laser source is configured to transmit light through the fiber-optic cable; an acoustic source configured to generate acoustic signals within the wall and, simultaneously with the laser source's transmission of the light, transmit the acoustic signals within the wall along the length of the pipe such that the acoustic signals interact with the fiber-optic cable along the length and influence characteristics of the light; a receiver attached to the fiber-optic cable, wherein the receiver is configured to detect the light; and a signal processing unit configured to determine a location of a change in the wall of the pipe between the laser source and the receiver based on a change in the characteristics of the light caused by a change in the acoustic signals, wherein the change in the acoustic signals is in response to an intrusion which is caused by erosion or corrosion of the wall of the pipe.

2. The system of claim 1 wherein the fiber-optic cable extends alongside a substantially full length of the wall along an external surface of the wall of the pipe or an internal surface of the wall of the pipe.

3. The system of claim 1, wherein the system is configured to continue to monitor the wall of the pipe if a portion of the fiber-optic cable is damaged.

4. The system of claim 1, wherein the fiber-optic cable comprises a plurality of fiber-optic cables, and wherein the number of the fiber-optic cables is correlative with dimensions of the wall of the pipe and the sensitivity of the fiber-optic cables.

5. The system of claim 1, wherein the system includes a plurality of fiber-optic cables comprising a first fiber-optic cable that is pressure-sensitive and a second fiber-optic cable that is pressure-insensitive.

6. The system of claim 1, wherein the laser source comprises a laser diode.

7. The system of claim 1, wherein the acoustic source comprises a moving source.

8. The system of claim 1, wherein the receiver comprises a photodiode, a phototransistor, a photomultiplier tube, or any combinations thereof.

9. The system of claim 1, wherein the signal processing unit comprises a phase locked loop.

10. The system of claim 1, wherein the intrusion in the wall of the pipe additionally comprises physical damage.

11. The system of claim 1, wherein the fiber-optic cable is disposed in a substantially straight, longitudinal line.

12. A system for real-time monitoring of a pipe that conveys hydrocarbons, comprising:
a fiber-optic cable disposed alongside a length of a wall of the pipe that conveys hydrocarbons;
a laser source attached to the fiber-optic cable, wherein the laser source is configured to transmit a light pulse through the fiber-optic cable;
an acoustic source configured to generate acoustic signals in the wall of the pipe simultaneously with the transmission of the light pulse through the fiber-optic cable, wherein the acoustic source comprises a moving source located in an internal volume of the pipe and configured to move along the length of the pipe such that the acoustic signals interact with the fiber-optic cable and influence characteristics of the light pulse in the fiber-optic cable;
a receiver attached to the fiber-optic cable, wherein the receiver is configured to detect the light pulse; and a signal processing unit configured to determine a location of an intrusion in the wall of the pipe between the laser source and the receiver based on a change in the characteristics of the light pulse caused by a change in the acoustic signals;

wherein the change in the acoustic signals is in response to an intrusion which is caused by erosion or corrosion of the wall of the pipe.

13. The system of claim 12, wherein the fiber-optic cable comprises a plurality of fiber-optic cables.

14. The system of claim 13, wherein the plurality of fiber-optic cables comprises a pressure-sensitive fiber-optic cable and a pressure-insensitive fiber-optic cable.

15. The system of claim 13, wherein damage to a fiber-optic cable does not stop monitoring of the wall of the pipe by the other fiber-optic cables in the plurality of fiber-optic cables.

16. The system of claim 12, wherein the moving source is attached to a cleaning pig.

17. The system of claim 12, wherein the acoustic signals comprise sound waves, pressure waves, or both.

18. The system of claim 12, wherein the acoustic signal is oriented at various angles as the acoustic source moves along the length of the pipe.

19. The system of claim 12, comprising a plurality of laser sources and a plurality of receivers disposed along the length of the wall of the pipe.

20. A method for monitoring changes in a wall of a pipe comprising:

disposing a fiber-optic cable alongside a length of the wall of the pipe;

attaching a light source to the fiber-optic cable to transmit light through the fiber-optic cable;

providing an acoustic source adjacent to, or within, the pipe to generate, simultaneously with the light source's transmission of the light, acoustic signals transmitted along the length of the pipe within the wall of the pipe that interact with the fiber-optic cable along the length to influence characteristics of the light pulse;

attaching a receiver to the fiber-optic cable to detect the light from the fiber-optic cable;

coupling a signal processing unit to the receiver, wherein the signal processing unit determines changes between the light originating from the light source and the light detected at the receiver caused by a change in the acoustic signals; and locating an intrusion on the wall of the pipe based, at least in part, on the changes between the light originating from the light source and the light detected at the receiver;

wherein the change in the acoustic signals is in response to an intrusion which is caused by erosion or corrosion of the wall of the pipe.

21. The method of claim 20, comprising installing the fiber-optic cable alongside a substantially full length of the pipe.

22. The method of claim 20, comprising attaching a plurality of laser sources and a plurality of receivers along the pipe.

* * * * *